(12) United States Patent
Downing

(10) Patent No.: US 11,821,779 B2
(45) Date of Patent: Nov. 21, 2023

(54) FLOW METER WITH IMPROVED OPERATIONAL VERIFICATION METHOD

(71) Applicant: MICRO MOTION, INC., Boulder, CO (US)

(72) Inventor: Bert J. Downing, Longmont, CO (US)

(73) Assignee: MICRO MOTION, INC., Boulder, CO (US)

( * ) Notice: Subject to any disclaimer, the term of this patent is extended or adjusted under 35 U.S.C. 154(b) by 459 days.

(21) Appl. No.: 17/260,311

(22) PCT Filed: Jul. 30, 2018

(86) PCT No.: PCT/US2018/044308
§ 371 (c)(1),
(2) Date: Jan. 14, 2021

(87) PCT Pub. No.: WO2020/027774
PCT Pub. Date: Feb. 6, 2020

(65) Prior Publication Data
US 2021/0285810 A1    Sep. 16, 2021

(51) Int. Cl.
*G01F 25/10* (2022.01)
*G01F 1/84* (2006.01)
*G01F 15/02* (2006.01)
*G01N 9/00* (2006.01)

(52) U.S. Cl.
CPC ............ *G01F 25/10* (2022.01); *G01F 1/8477* (2013.01); *G01F 15/022* (2013.01); *G01N 9/002* (2013.01); *G01N 2009/006* (2013.01)

(58) Field of Classification Search
None
See application file for complete search history.

(56) References Cited

U.S. PATENT DOCUMENTS 6,327,914 B1 * 12/2001 Dutton ................... G01N 9/002
73/861.357
2002/0194351 A1 * 12/2002 Nishimura ............ H04L 65/612
709/229

(Continued)

FOREIGN PATENT DOCUMENTS

JP    2003130704 A    5/2003
JP    2007263859 A    10/2007
(Continued)

*Primary Examiner* — Brandi N Hopkins
*Assistant Examiner* — Nigel H Plumb
(74) *Attorney, Agent, or Firm* — The Ollila Law Group LLC

(57) ABSTRACT

A method for verifying accurate operation for a flow meter (5) is provided. The method entails receiving a vibrational response from the flow meter (5), wherein the vibrational response comprises a response to a vibration of the flow meter (5) at a substantially resonant frequency. At least one gain decay variable is measured. It is then determined whether the gain decay variable is outside a predetermined range. A filter used in a stiffness calculation is adjusted if the gain decay variable is outside the predetermined range. The ability to detect and/or quantify any changes to the stiffness of the meter assembly in order to maintain a high level of accuracy is an improvement in the field of flow meters.

14 Claims, 8 Drawing Sheets

(56) References Cited

U.S. PATENT DOCUMENTS

| | | | |
|---|---|---|---|
| 2008/0281535 A1* | 11/2008 | Rensing | G01F 1/8413 |
| | | | 702/56 |
| 2011/0138205 A1* | 6/2011 | McAnally | G01F 1/8436 |
| | | | 713/320 |
| 2011/0178738 A1* | 7/2011 | Rensing | G01F 1/8477 |
| | | | 702/56 |

FOREIGN PATENT DOCUMENTS

| | | |
|---|---|---|
| WO | 0019175 A1 | 4/2000 |
| WO | 2007040468 A1 | 4/2007 |
| WO | 2010014087 A1 | 2/2010 |

* cited by examiner

FIG. 1 - Prior Art

FLOW METER WITH IMPROVED OPERATIONAL VERIFICATION METHOD

BACKGROUND

The present disclosure relates to a meter electronics and methods for verification diagnostics for a flow meter.

Vibrating conduit sensors, such as Coriolis mass flow meters or vibrating tube densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A conduit of a vibratory flow meter can include one or more flow tubes. A flow tube is forced to vibrate at a resonant frequency, where the resonant frequency of the tube is proportional to the density of the fluid in the flow tube. Sensors located on the inlet and outlet sections of the tube measure the relative vibration between the ends of the tube. During flow, the vibrating tube and the flowing mass couple together due to Coriolis forces, causing a phase shift in the vibration between the ends of the tube. The phase shift is directly proportional to the mass flow.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling. The instrumentation receives signals from the two pickoff sensors and processes the signals in order to derive a mass flow rate measurement.

The phase difference between the two sensor signals is related to the mass flow rate of the material flowing through the flow tube or flow tubes. The mass flow rate of the material is proportional to the time delay between the two sensor signals, and the mass flow rate can therefore be determined by multiplying the time delay by a Flow Calibration Factor (FCF), where the time delay comprises a phase difference divided by frequency. The FCF reflects the material properties and cross-sectional properties of the flow tube. In the prior art, the FCF is determined by a calibration process prior to installation of the flow meter into a pipeline or other conduit. In the calibration process, a fluid is passed through the flow tube at a given flow rate and the proportion between the phase difference and the flow rate is calculated.

One advantage of a Coriolis flow meter is that the accuracy of the measured mass flow rate is not affected by wear of moving components in the flow meter. The flow rate is determined by multiplying the phase difference between two points of the flow tube and the flow calibration factor. The only input is the sinusoidal signals from the sensors, indicating the oscillation of two points on the flow tube. The phase difference is calculated from these sinusoidal signals. There are no moving components in the vibrating flow tube. Therefore, the measurement of the phase difference and the flow calibration factor are not affected by wear of moving components in the flow meter.

The FCF can be related to a stiffness characteristic of the meter assembly. If the stiffness characteristic of the meter assembly changes, then the FCF will also change. Changes therefore will affect the accuracy of the flow measurements generated by the flow meter. Changes in the material and cross-sectional properties of a flow tube can be caused by erosion or corrosion, for example. Consequently, it is highly desirable to be able to detect and/or quantify any changes to the stiffness of the meter assembly in order to maintain a high level of accuracy in the flow meter.

SUMMARY

According to an embodiment, a method for verifying accurate operation for a flow meter is provided. The method comprises the step of receiving a vibrational response from the flow meter, wherein the vibrational response comprises a response to a vibration of the flow meter at a substantially resonant frequency. At least one gain decay variable is measured. It is also determined whether the gain decay variable is outside a predetermined range, and a filter used in a stiffness calculation is adjusted if the gain decay variable is outside the predetermined range.

According to an embodiment, meter electronics for verifying accurate operation for a flow meter is provided. The meter electronics comprises an interface for receiving a vibrational response from the flow meter, with the vibrational response comprising a response to a vibration of the flow meter at a substantially resonant frequency, and a processing system in communication with the interface. The processing system is configured to measure at least one gain decay variable, determine whether the gain decay variable is outside a predetermined range, and adjust filtering used in a stiffness calculation if the gain decay variable is outside the predetermined range.

Aspects

According to an aspect, a method for verifying accurate operation for a flow meter comprises the step of receiving a vibrational response from the flow meter, wherein the vibrational response comprises a response to a vibration of the flow meter at a substantially resonant frequency. At least one gain decay variable is measured. It is also determined whether the gain decay variable is outside a predetermined range, and a filter used in a stiffness calculation is adjusted if the gain decay variable is outside the predetermined range.

Preferably, the step of measuring at least one gain decay variable comprises measuring the at least one gain decay variable at a first time point, measuring the at least one gain decay variable at a second and different time point, and adjusting the filter only if the at least one measured gain decay variable value at the first time point is different from the at least one measured gain decay variable value at the second time point.

Preferably, the gain decay variables comprise at least one of a pickoff voltage, drive currents, flowtube frequency, and temperature.

Preferably, the method comprises measuring a first slope of one of the gain decay variables over a first time period, measuring a second slope of the same one of the gain decay variables over a second time period, determining a trend exists if the first slope and second slope are the same, and preventing meter verification while a trend exists.

Preferably, a coefficient of variation of the at least one gain decay variable is calculated.

Preferably, the step of adjusting filtering comprises at least one of increasing the number of filtering events, the types of filters employed, and the number of samples filtered.

Preferably, the method comprises measuring a decay characteristic by removing the excitation of the flow meter, allowing a vibrational response of the flow meter to decay down to a predetermined vibrational target while measuring the decay characteristic, and adjusting filtering by changing a number of decay characteristic samples taken.

According to an aspect, meter electronics for verifying accurate operation for a flow meter comprise an interface for receiving a vibrational response from the flow meter, with the vibrational response comprising a response to a vibration of the flow meter at a substantially resonant frequency, and a processing system in communication with the interface. The processing system is configured to measure at least one gain decay variable, determine whether the gain decay variable is outside a predetermined range, and adjust filtering used in a stiffness calculation if the gain decay variable is outside the predetermined range.

Preferably, measuring at least one gain decay variable comprises measuring the at least one gain decay variable at a first time point, and measuring the at least one gain decay variable at a second and different time point, and adjusting filters only if the at least one measured gain decay variable value at the first time point is different from the at least one measured gain decay variable value at the second time point.

Preferably, gain decay variables comprise at least one of pickoff voltages, drive currents, flowtube frequency, and temperature.

Preferably, the processing system is further configured to measure a first slope of one of the gain decay variables over a first time period and a second slope of the same one of the gain decay variables over a second time period, and determine that a trend exists if the first slope and second slope are the same, wherein meter verification is prevented while a trend exists.

Preferably, a coefficient of variation of the at least one gain decay variable is calculated.

Preferably, adjusting filtering comprises at least one of increasing the number of filtering events, the types of filters employed, and the number of samples filtered.

Preferably, the processing system is further configured to measure the decay characteristic by removing the excitation of the flow meter and allowing the vibrational response of the flow meter to decay down to a predetermined vibrational target while measuring the decay characteristic, and wherein adjusting filtering comprises changing a number of decay characteristic samples taken.

DESCRIPTION OF THE DRAWINGS

The same reference number represents the same element on all drawings.

DETAILED DESCRIPTION

FIGS. 1-8 and the following description depict specific examples to teach those skilled in the art how to make and use the best mode of the embodiments. For the purpose of teaching inventive principles, some conventional aspects have been simplified or omitted. Those skilled in the art will appreciate variations from these examples that fall within the scope of the embodiments. Those skilled in the art will appreciate that the features described below can be combined in various ways to form multiple variations. As a result, the embodiments are not limited to the specific examples described below, but only by the claims and their equivalents.

Figure 1:
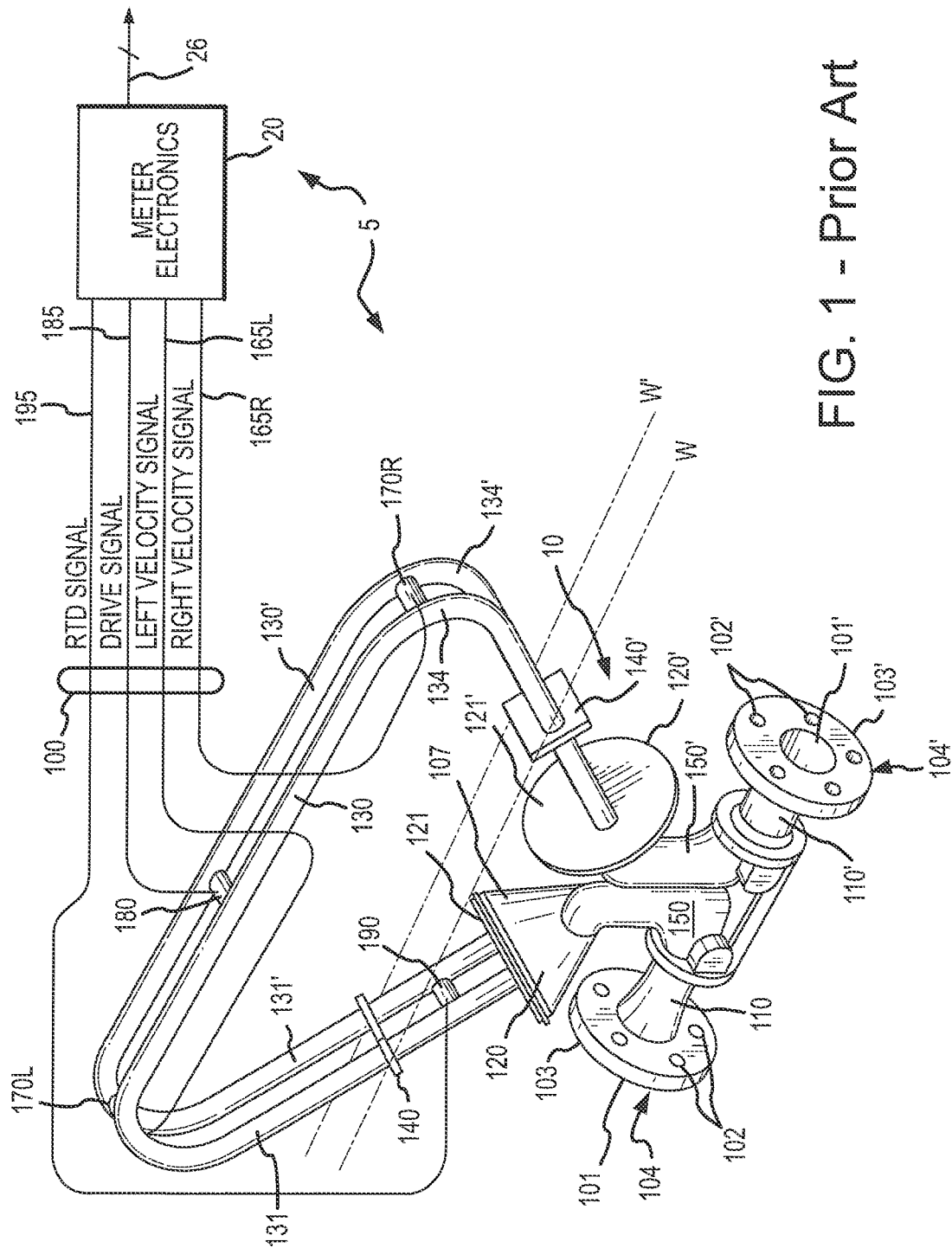
FIG. 1 shows a flow meter comprising a meter assembly and meter electronics.

FIG. 1 shows a flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present embodiments. A Coriolis flow meter structure is described although it is apparent to those skilled in the art that the present embodiments could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well-known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well-known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive mechanism 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means.

Figure 2:
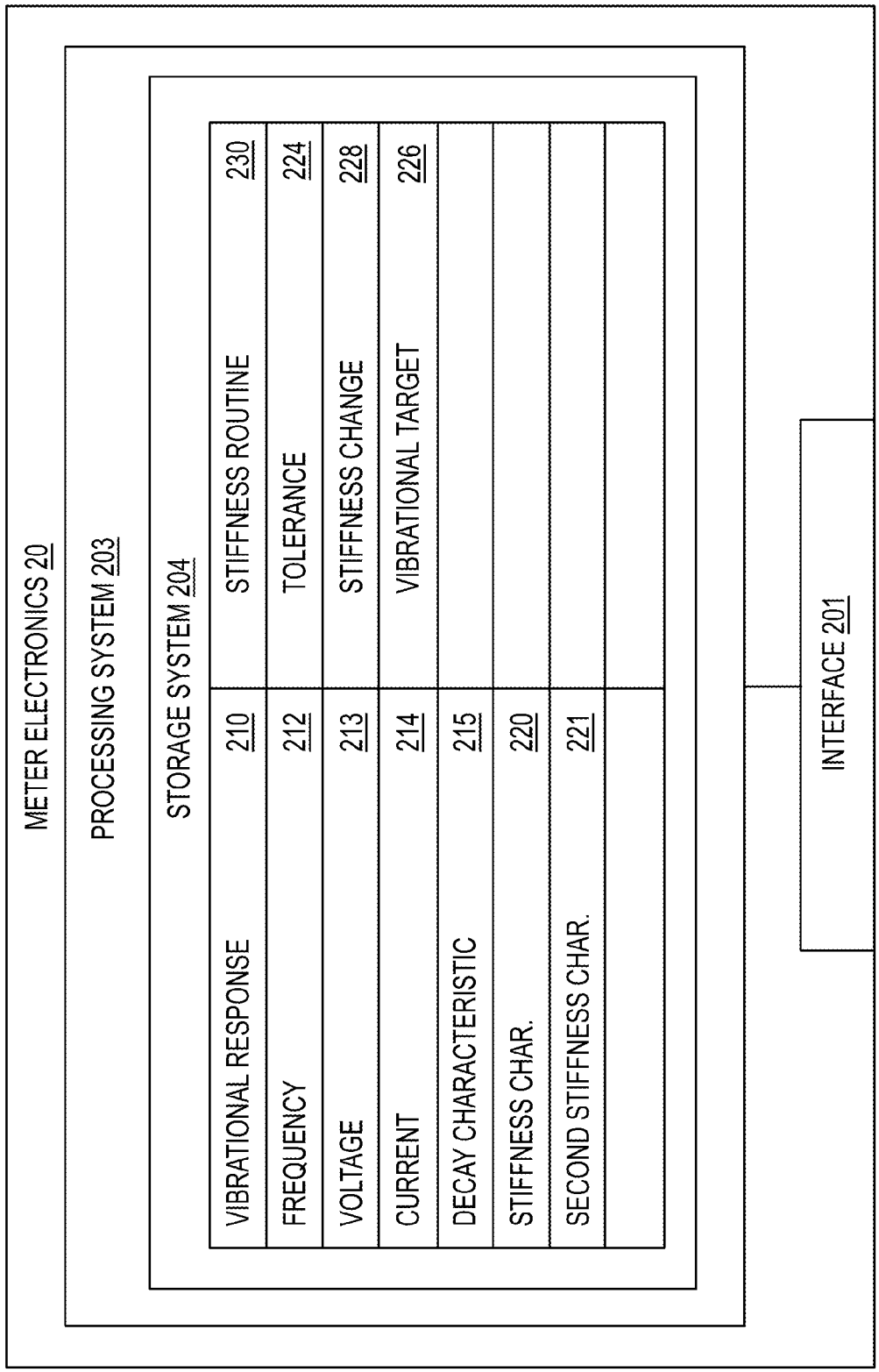
FIG. 2 shows meter electronics according to an embodiment.

FIG. 2 shows the meter electronics 20 according to an embodiment. The meter electronics 20 can include an interface 201 and a processing system 203. The meter electronics 20 receives a vibrational response 210, such as from the meter assembly 10, for example. The meter electronics 20 processes the vibrational response 210 in order to obtain flow characteristics of the flow material flowing through the meter assembly 10. In addition, in the meter electronics 20 according to an embodiment, the vibrational response 210 is also processed in order to determine a stiffness parameter (K) of the meter assembly 10. Furthermore, the meter electronics 20 can process two or more such vibrational responses, over time, in order to detect a stiffness change (ΔK) in the meter assembly 10. The stiffness determination can be made under flow or no-flow conditions. A no-flow determination may offer the benefit of a reduced noise level in the resulting vibrational response.

As previously discussed, the Flow Calibration Factor (FCF) reflects the material properties and cross-sectional properties of the flow tube. A mass flow rate of flow material flowing through the flow meter is determined by multiplying a measured time delay (or phase difference/frequency) by the FCF. The FCF can be related to a stiffness characteristic of the meter assembly. If the stiffness characteristic of the meter assembly changes, then the FCF will also change. Changes in the stiffness of the flow meter therefore will affect the accuracy of the flow measurements generated by the flow meter.

The embodiments are significant because they enable the meter electronics 20 to perform a stiffness determination in the field, without performing an actual flow calibration test. It enables a stiffness determination without a calibration test stand or other special equipment or special fluids. This is desirable because performing a flow calibration in the field is expensive, difficult, and time-consuming. However, a better and easier calibration check is desirable because the stiffness of the meter assembly 10 can change over time, in use. Such changes can be due to factors such as erosion of a flow tube, corrosion of a flow tube, and damage to the meter assembly 10, for example.

The vibrational response of a flow meter can be represented by an open loop, second order drive model, comprising:

$$M\ddot{x}+C\dot{x}+Kx=f \quad (1)$$

where f is the force applied to the system, M is a mass of the system, C is a damping characteristic, and K is a stiffness characteristic of the system. The term K comprises $K=M(\omega_0)^2$ and the term C comprises $C=M2\zeta\omega_0$, where $\zeta$ comprises a decay characteristic, and $\omega_0=2\pi f_0$ where $f_0$ is the natural/resonant frequency of the meter assembly 10 in Hertz. In addition, x is the physical displacement distance of the vibration, $\dot{x}$ is the velocity of the flowtube displacement, and $\ddot{x}$ is the acceleration. This is commonly referred to as the MCK model. This formula can be rearranged into the form:

$$M[s^2+2\zeta\omega_0 s+\omega_0^2]x=f \quad (2)$$

Equation (2) can be further manipulated into a transfer function form. In the transfer function form, a term of displacement over force is used, comprising:

$$\frac{x}{f} = \frac{s}{M[s^2 + 2\zeta\omega_0 s + \omega_0^2]} \quad (3)$$

Well-known magnetic equations can be used to simplify equation (3). Two applicable equations are:

$$V=BL_{PO}*\dot{x} \quad (4)$$

and $$f=BL_{DR}*I \quad (5)$$

The sensor voltage $V_{EMF}$ of equation (4) (at a pick-off sensor 170L or 170R) is equal to the pick-off sensitivity factor $BL_{PO}$ multiplied by the pick-off velocity of motion $\dot{x}$. The pick-off sensitivity factor $BL_{PO}$ is generally known or measured for each pick-off sensor. The force (f) generated by the driver 180 of equation (5) is equal to the driver sensitivity factor $BL_{DR}$ multiplied by the drive current (I) supplied to the driver 180. The driver sensitivity factor $BL_{DR}$ of the driver 180 is generally known or measured. The factors $BL_{PO}$ and $BL_{DR}$ are both a function of temperature, and can be corrected by a temperature measurement.

By substituting the magnetic equations (4) and (5) into the transfer function of equation (3), the result is:

$$\frac{V}{I} = \frac{BL_{PO} * BL_{DR} * s}{M[s^2 + 2\zeta\omega_0 s + \omega_0^2]} \quad (6)$$

If the meter assembly 10 is driven open loop on resonance, i.e., at a resonant/natural frequency $\omega_0$ (where $\omega_0 = 2\pi f_0$), then equation (6) can be rewritten as:

$$\left(\frac{V}{I}\right)_{\omega_0} = \frac{BL_{PO} * BL_{DR} * \omega_0}{2\zeta[M\omega_0^2]} \quad (7)$$

By substituting for stiffness, equation (7) is simplified to:

$$\left(\frac{V}{I}\right)_{\omega_0} = \frac{BL_{PO} * BL_{DR} * \omega_0}{2\zeta K} \quad (8)$$

Here, the stiffness parameter (K) can be isolated in order to obtain:

$$K = \frac{I * BL_{PO} * BL_{DR} * \omega_0}{2\zeta V} \quad (9)$$

As a consequence, by measuring/quantifying the decay characteristic ($\zeta$), along with the drive voltage (V) and drive current (I), the stiffness parameter (K) can be determined. The response voltage (V) from the pick-offs can be determined from the vibrational response, along with the drive current (I). The process of determining the stiffness parameter (K) is discussed in more detail in conjunction with FIG. 3, below.

In use, the stiffness parameter (K) can be tracked over time. For example, statistical techniques can be used to determine any changes over time (i.e., a stiffness change ($\Delta K$)). A statistical change in the stiffness parameter (K) can indicate that the FCF for the particular flow meter has changed.

The embodiments provide a stiffness parameter (K) that does not rely on stored or recalled calibration density values. This is in contrast to the prior art, where a known flow material is used in a factory calibration operation to obtain a density standard that can be used for all future calibration operations. The embodiments provide a stiffness parameter (K) that is obtained solely from vibrational responses of the flow meter. The embodiments provide a stiffness detection/calibration process without the need for a factory calibration process.

The interface 201 receives the vibrational response 210 from one of the velocity sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment is coupled with a digitizer (not shown), wherein the sensor signal comprises an analog sensor signal. The digitizer samples and digitizes an analog vibrational response and produces the digital vibrational response 210.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The storage system 204 can store flow meter parameters and data, software routines, constant values, and variable values. In one embodiment, the storage system 204 includes routines that are executed by the processing system 203, such as a stiffness routine 230 that determines the stiffness parameter (K) of the flow meter 5.

Figure 3:
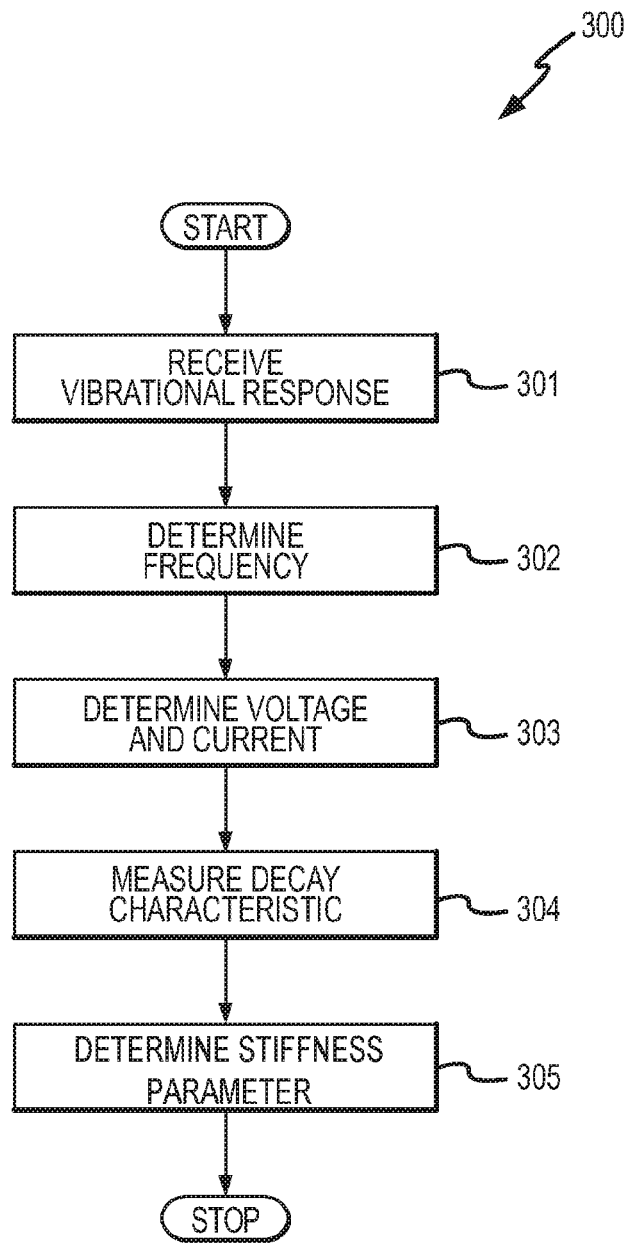
FIG. 3 is a flowchart of a method for determining a stiffness parameter (K) of a flow meter according to an embodiment.

The stiffness routine 230 in one embodiment can configure the processing system 203 to receive a vibrational response from the flow meter, with the vibrational response comprising a response to a vibration of the flow meter at a substantially resonant frequency, determine a frequency ($\omega_0$) of the vibrational response, determine a response voltage (V) and a drive current (I) of the vibrational response, measure a decay characteristic ($\zeta$) of the flow meter, and determine the stiffness parameter (K) from the frequency ($\omega_0$), the response voltage (V), the drive current (I), and the decay characteristic ($\zeta$) (see FIG. 3 and the accompanying discussion).

The stiffness routine 230 in one embodiment can configure the processing system 203 to receive the vibrational response, determine the frequency, determine the response voltage (V) and the drive current (I), measure the decay characteristic ($\zeta$), and determine the stiffness parameter (K). The stiffness routine 230 in this embodiment further configures the processing system 203 to receive a second vibrational response from the flow meter at a second time $t_2$, repeat the determining and measuring steps for the second vibrational response in order to generate a second stiffness characteristic ($K_2$), compare the second stiffness characteristic ($K_2$) to the stiffness parameter (K), and detect the stiffness change ($\Delta K$) if the second stiffness characteristic ($K_2$) differs from the stiffness parameter (K) by more than a tolerance 224 (see FIG. 4 and the accompanying discussion).

In one embodiment, the storage system 204 stores variables used to operate the flow meter 5. The storage system 204 in one embodiment stores variables such as the vibrational response 210, which can be received from the velocity/pickoff sensors 170L and 170R, for example.

In one embodiment, the storage system 204 stores constants, coefficients, and working variables. For example, the storage system 204 can store a determined stiffness characteristic 220 and a second stiffness characteristic 221 that is generated at a later point in time. The storage system 204 can store working values such as a frequency 212 of the vibrational response 210, a voltage 213 of the vibrational response 210, and a drive current 214 of the vibrational response 210. The storage system 204 can further store a vibrational target 226 and a measured decay characteristic 215 of the flow meter 5. In addition, the storage system 204 can store constants, thresholds, or ranges, such as the tolerance 224. Moreover, the storage system 204 can store data accumulated over a period of time, such as the stiffness change 228.

FIG. 3 is a flowchart 300 of a method for determining a stiffness parameter (K) of a flow meter according to an embodiment. In step 301, a vibrational response is received from the flow meter. The vibrational response is a response of the flow meter to a vibration at a substantially resonant frequency. The vibration can be continuous or intermittent. A flow material can be flowing through the meter assembly 10 or can be static.

In step 302, a frequency of the vibrational response is determined. The frequency $\omega_0$ can be determined from the vibrational response by any method, process, or hardware.

In step 303, the voltage (V or $V_{EMF}$) of the vibrational response is determined, along with the drive current (I). The voltage and drive current can be obtained from an unprocessed or a conditioned vibrational response.

In step 304, a damping characteristic of the flow meter is measured. The damping characteristic can be measured by allowing the vibrational response of the flow meter to decay down to a vibrational target while measuring the decay characteristic. This decaying action can be performed in several ways. The drive signal amplitude can be reduced, the driver 180 can actually perform braking of the meter assembly 10 (in appropriate flow meters), or the driver 180 can be merely unpowered until the target is reached. In one embodiment, the vibrational target comprises a reduced level in a drive setpoint. For example, if the drive setpoint is currently at 3.4 mV/Hz, then for the damping measurement the drive setpoint can be reduced to a lower value, such as 2.5 mV/Hz, for example. In this manner, the meter electronics 20 can let the meter assembly 10 simply coast until the vibrational response substantially matches this new drive target.

In step 305, the stiffness parameter (K) is determined from the frequency, the voltage, the drive current, and the decay characteristic ($\zeta$). The stiffness parameter (K) can be determined according to equation (9), above. In addition to determining and tracking the stiffness (K), the method can also determine and track a damping parameter (C) and a mass parameter (M).

The method 300 can be iteratively, periodically, or randomly performed. The method 300 can be performed at predetermined landmarks, such as at a predetermined hours of operation, upon a change in flow material, etc.

Figure 4:
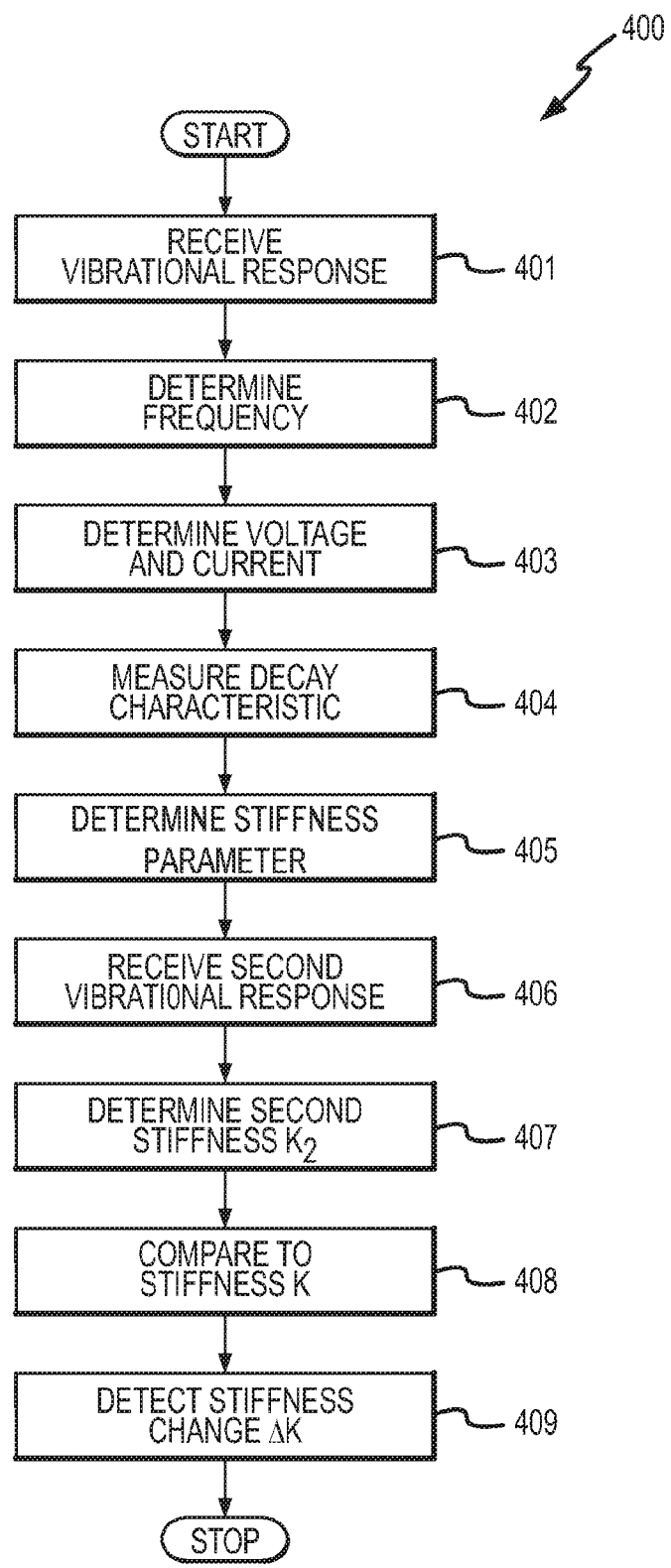
FIG. 4 is a flowchart of a method for determining a stiffness change (ΔK) in a flow meter according to an embodiment.

FIG. 4 is a flowchart 400 of a method for determining a stiffness change ($\Delta K$) in a flow meter according to an embodiment. In step 401, a vibrational response is received from the flow meter, as previously discussed.

In step 402, a frequency of the vibrational response is determined, as previously discussed.

In step 403, the voltage and drive current of the vibrational response are determined, as previously discussed.

In step 404, the decay characteristic ($\zeta$) of the flow meter is measured, as previously discussed.

In step 405, the stiffness parameter (K) is determined from the frequency, the voltage, the drive current, and the decay characteristic ($\zeta$), as previously discussed.

In step 406, a second vibrational response is received at a second time instance $t_2$. The second vibrational response is generated from a vibration of the meter assembly 10 at time $t_2$.

In step 407, a second stiffness characteristic $K_2$ is generated from the second vibrational response. The second stiffness characteristic $K_2$ can be generated using steps 401 through 405, for example.

In step 408, the second stiffness characteristic $K_2$ is compared to the stiffness parameter (K). The comparison comprises a comparison of stiffness characteristics that are obtained at different times in order to detect a stiffness change ($\Delta K$).

In step 409, any stiffness change ($\Delta K$) between $K_2$ and K is detected. The stiffness change determination can employ any manner of statistical or mathematical method for determining a significant change in stiffness. The stiffness change ($\Delta K$) can be stored for future use and/or can be transmitted to a remote location. In addition, the stiffness change ($\Delta K$) can trigger an alarm condition in the meter electronics 20. The stiffness change ($\Delta K$) in one embodiment is first compared to the tolerance 224. If the stiffness change ($\Delta K$) exceeds the tolerance 224, then an error condition is determined. In addition to determining and tracking the stiffness (K), the method can also determine and track a damping parameter (C) and a mass parameter (M).

The method 400 can be iteratively, periodically, or randomly performed. The method 400 can be performed at predetermined landmarks, such as at a predetermined hours of operation, upon a change in flow material, etc.

Figure 5:
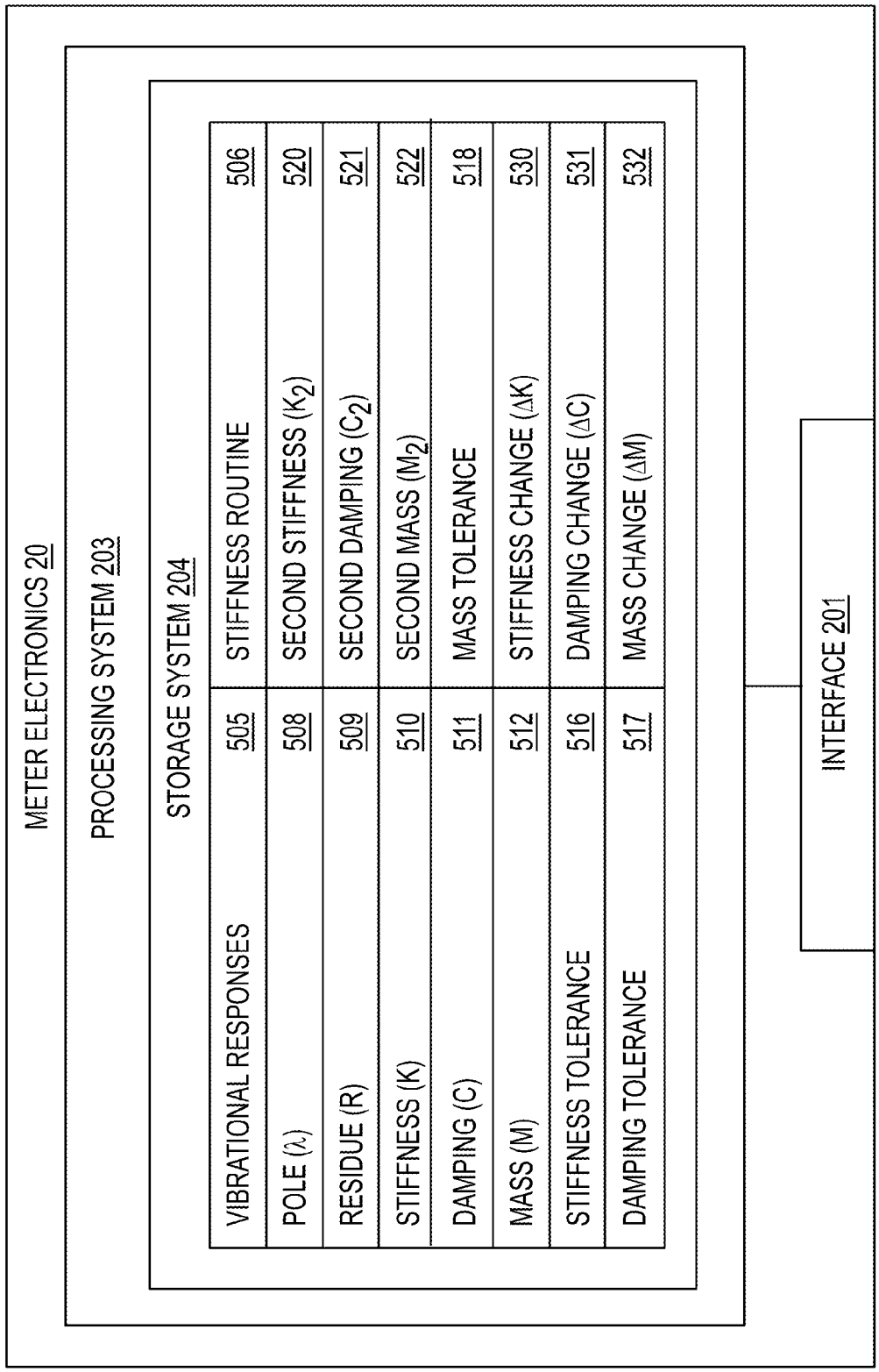
FIG. 5 shows the meter electronics according to another embodiment.

FIG. 5 shows the meter electronics 20 according to another embodiment. The meter electronics 20 in this embodiment can include the interface 201, the processing system 203, and the storage system 204, as previously discussed. The meter electronics 20 receives three or more vibrational responses 505, such as from the meter assembly 10, for example. The meter electronics 20 processes the three or more vibrational responses 505 in order to obtain flow characteristics of the flow material flowing through the meter assembly 10. In addition, the three or more vibrational responses 505 are also processed in order to determine a stiffness parameter (K) of the meter assembly 10. The meter electronics 20 can further determine a damping parameter (C) and a mass parameter (M) from the three or more vibrational responses 505. These meter assembly parameters can be used to detect changes in the meter assembly 10, as previously discussed.

The storage system 204 can store processing routines, such as the stiffness routine 506. The storage system 204 can store received data, such as the vibrational responses 505. The storage system 204 can store pre-programmed or user-entered values, such as the stiffness tolerance 516, the damping tolerance 517, and the mass tolerance 518. The storage system 204 can store working values, such as the pole ($\lambda$) 508 and the residue (R) 509. The storage system 204 can store determined final values, such as the stiffness (K) 510, the damping (C) 511, and the mass (M) 512. The storage system 204 can store comparison values generated and operated on over periods of time, such as a second stiffness ($K_2$) 520, a second damping ($C_2$) 521, a second mass ($M_2$) 522, a stiffness change ($\Delta K$) 530, a damping change ($\Delta C$) 531, and a mass change ($\Delta M$) 532. The stiffness change ($\Delta K$) 530 can comprise a change in the stiffness parameter (K) of the meter assembly 10 as measured over time. The stiffness change ($\Delta K$) 530 can be used to detect and determine physical changes to the meter assembly 10 over time, such as corrosion and erosion effects. In addition, the mass parameter (M) 512 of the meter assembly 10 can be measured and tracked over time and stored in a mass change ($\Delta M$) 532 and a damping parameter (C) 511 can be measured over time and stored in a damping change ($\Delta C$) 531. The mass change ($\Delta M$) 532 can indicate the presence of build-up of flow materials in the meter assembly 10 and the damping change ($\Delta C$) 531 can indicate changes in a flow tube, including material degradation, erosion and corrosion, cracking, etc.

In operation, the meter electronics 20 receives three or more vibrational responses 505 and processes the vibrational responses 505 using the stiffness routine 506. In one embodiment, the three or more vibrational responses 505 comprise five vibrational responses 505, as will be discussed below. The meter electronics 20 determines the pole ($\lambda$) 508 and the residue (R) 509 from the vibrational responses 505. The pole ($\lambda$) 508 and residue (R) 509 can comprise a first order pole and residue or can comprise a second order pole and residue. The meter electronics 20 determines the stiffness parameter (K) 510, the damping parameter (C) 511, and the mass parameter (M) 512 from the pole ($\lambda$) 508 and the residue (R) 509. The meter electronics 20 can further determine a second stiffness ($K_2$) 520, can determine a stiffness change ($\Delta K$) 530 from the stiffness parameter (K) 510 and the second stiffness ($K_2$) 520, and can compare the stiffness change ($\Delta K$) 530 to a stiffness tolerance 516. If the stiffness change ($\Delta K$) 530 exceeds the stiffness tolerance 516, the meter electronics 20 can initiate any manner of error recordation and/or error processing routine. Likewise, the meter electronics 20 can further track the damping and mass parameters over time and can determine and record a second damping ($C_2$) 521 and a second mass ($M_2$) 522, and a resulting damping change ($\Delta C$) 531 and mass change ($\Delta M$) 532. The damping change ($\Delta C$) 531 and the mass change ($\Delta M$) 532 can likewise be compared to a damping tolerance 517 and a mass tolerance 518.

The vibrational response of a flow meter can be represented by an open loop, second order drive model, comprising:

$$M\ddot{x}+C\dot{x}+Kx=f \qquad (1)$$

where f is the force applied to the system, M is a mass parameter of the system, C is a damping parameter, and K is a stiffness parameter. The term K comprises $K=M(\omega_0)2$ and the term C comprises $C=M2\zeta\omega_0$, where $\omega_0=2\pi f_0$ and $f_0$ is the resonant frequency of the meter assembly 10 in Hertz. The term comprises a decay characteristic measurement obtained from the vibrational response, as previously discussed. In addition, x is the physical displacement distance of the vibration, $\dot{x}$ is the velocity of the flowtube displacement, and $\ddot{x}$ is the acceleration. This is commonly referred to as the MCK model. This formula can be rearranged into the form:

$$(ms^2+cs+k)X(s)=F(s)+(ms+c)x(0)+m\dot{x}(0) \qquad (11)$$

Equation (11) can be further manipulated into a transfer function form, while ignoring the initial conditions. The result is:

$$H(s) = \frac{output}{input} = \frac{X(s)}{F(s)} = \frac{\frac{1}{m}}{s^2 + \frac{cs}{m} + \frac{k}{m}} \qquad (12)$$

Further manipulation can transform equation (12) into a first order pole-residue frequency response function form, comprising:

$$H(\omega) = \frac{R}{(j\omega - \lambda)} + \frac{\overline{R}}{(j\omega - \overline{\lambda})} \qquad (13)$$

where $\lambda$, is the pole, R is the residue, the term (j) comprises the square root of −1, and $\omega$ is the circular excitation frequency (in radians per second).

The system parameters comprising the natural/resonant frequency ($\omega_n$), the damped natural frequency ($\omega_d$), and the decay characteristic ($\zeta$) are defined by the pole.

$$\omega_n = |\lambda| \qquad (14)$$

$$\omega_d = imag(\lambda) \qquad (15)$$

$$\zeta = \frac{real(\lambda)}{\omega_n} \qquad (16)$$

The stiffness parameter (K), the damping parameter (C), and the mass parameter (M) of the system can be derived from the pole and residue.

$$M = \frac{1}{2jR\omega_d} \qquad (17)$$

$$K = \omega_n^2 M \qquad (18)$$

$$C = 2\zeta\omega_n M \qquad (19)$$

Consequently, the stiffness parameter (K), the mass parameter (M), and the damping parameter (C) can be calculated based on a good estimate of the pole ($\lambda$) and the residue (R).

The pole and residue are estimated from the measured frequency response functions. The pole ($\lambda$) and the residue (R) can be estimated using some manner of direct or iterative computational method.

The response near the drive frequency is composed of primarily the first term of equation (13), with the complex conjugate term contributing only a small, nearly constant "residual" part of the response. As a result, equation (13) can be simplified to:

$$H(\omega) = \frac{R}{(j\omega - \lambda)} \qquad (20)$$

In equation (20), the $H(\omega)$ term is the measured frequency response function (FRF), obtained from the three or more vibrational responses. In this derivation, H is composed of a displacement output divided by a force input. However, with the voice coil pickoffs typical of a Coriolis flow meter, the measured FRF (i.e., a $\dot{H}$ term) is in terms of velocity divided by force. Therefore, equation (20) can be transformed into the form:

$$\dot{H}(\omega) = H(\omega) \cdot j\omega = \frac{j\omega R}{(j\omega - \lambda)} \qquad (21)$$

Equation (21) can be further rearranged into a form that is easily solvable for the pole ($\lambda$) and the residue (R).

$$\dot{H}j\omega - \dot{H}\lambda = j\omega R \qquad (22)$$

$$\dot{H} = R + \frac{\dot{H}}{j\omega}\lambda$$

$$\left[1\;\frac{\dot{H}}{j\omega}\right]\left\{\begin{array}{c}R\\\lambda\end{array}\right\} = \dot{H}$$

Equation (22) forms an over-determined system of equations. Equation (22) can be computationally solved in order to determine the pole (λ) and the residue (R) from the velocity/force FRF (Ḣ). The terms H, R, and λ, are complex.

In one embodiment, the forcing frequency ω is 5 tones. The 5 tones in this embodiment comprise the drive frequency and 2 tones above the drive frequency and 2 tones below. The tones can be separated from the fundamental frequency by as little as 0.5-2 Hz. However, the forcing frequency co can comprise more tones or fewer tones, such as a drive frequency and 1 tone above and below. However, 5 tones strikes a good compromise between accuracy of the result and the processing time needed to obtain the result.

Note that in the preferred FRF measurement, two FRFs are measured for a particular drive frequency and vibrational response. One FRF measurement is obtained from the driver to the right pickoff (RPO) and one FRF measurement is obtained from the driver to the left pickoff (LPO). This approach is called single input, multiple output (SIMO). A SIMO technique is used to better estimate the pole (λ) and the residue (R). Previously, the two FRFs were used separately to give two separate pole (λ) and residue (R) estimates. Recognizing that the two FRFs share a common pole (λ) but separate residues ($R_L$) and ($R_R$), the two measurements can be combined advantageously to result in a more robust pole and residue determination.

$$\begin{bmatrix} 1 & 0 & \frac{\dot{H}_{LPO}}{j\omega} \\ 0 & 1 & \frac{\dot{H}_{RPO}}{j\omega} \end{bmatrix} \begin{Bmatrix} R_L \\ R_R \\ \lambda \end{Bmatrix} = \dot{H} \quad (23)$$

Equation (23) can be solved in any number of ways. In one embodiment, the equation is solved through a recursive least squares approach. In another embodiment, the equation is solved through a pseudo-inverse technique. In yet another embodiment, because all of the measurements are available simultaneously, a standard Q-R decomposition technique can be used. The Q-R decomposition technique is discussed in Modern Control Theory, William Brogan, copyright 1991, Prentice Hall, pp. 222-224, 168-172.

In use, the stiffness parameter (K), along with the damping parameter (C) and the mass parameter (M), can be tracked over time. For example, statistical techniques can be used to determine any changes in the stiffness parameter (K) over time (i.e., a stiffness change (ΔK)). A statistical change in the stiffness parameter (K) can indicate that the FCF for the particular flow meter has changed.

The embodiments provide a stiffness parameter (K) that does not rely on stored or recalled calibration density values. This is in contrast to the prior art, where a known flow material is used in a factory calibration operation to obtain a density standard that can be used for all future calibration operations. The embodiments provide a stiffness parameter (K) that is obtained solely from vibrational responses of the flow meter. The embodiments provide a stiffness detection/calibration process without the need for a factory calibration process.

Figure 6:
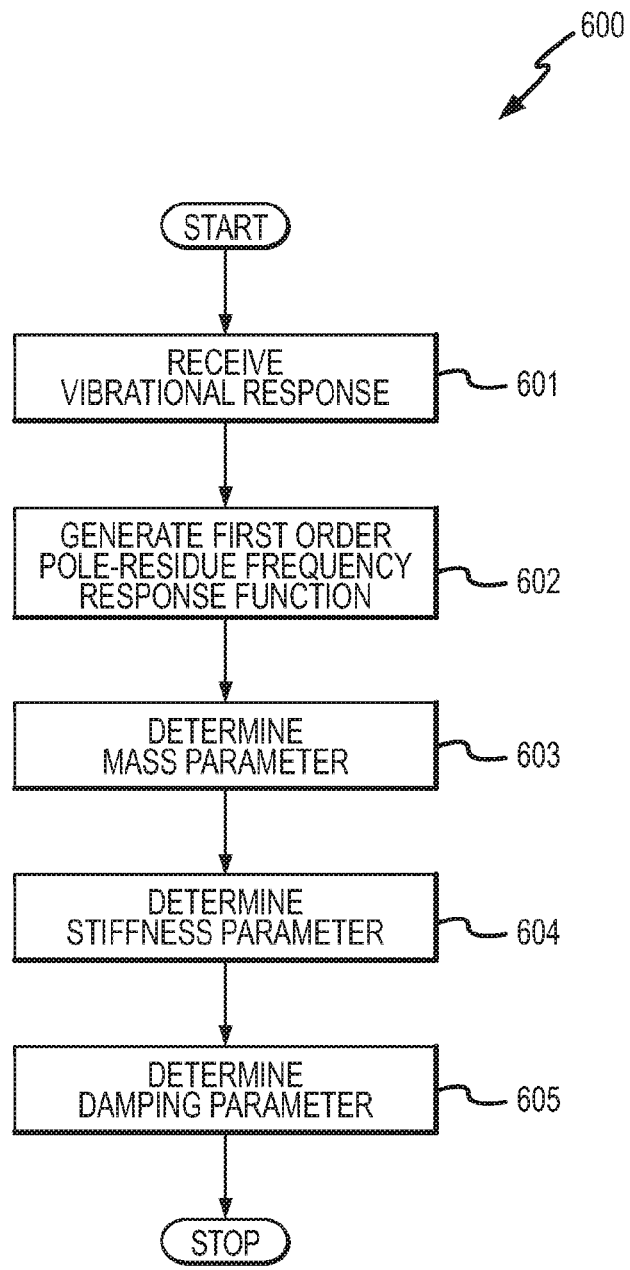
FIG. 6 is a flowchart of a method for determining a stiffness parameter (K) of a flow meter according to an embodiment.

FIG. 6 is a flowchart 600 of a method for determining a stiffness parameter (K) of a flow meter according to an embodiment. In step 601, three or more vibrational responses are received. The three or more vibrational responses can be received from the flow meter. The three or more vibrational responses can include a substantially fundamental frequency response and two or more non-fundamental frequency responses. In one embodiment, one tone above the fundamental frequency response is received and one tone below the fundamental frequency response is received. In another embodiment, two or more tones above the fundamental frequency response are received and two or more tones below the fundamental frequency response are received.

In one embodiment, the tones are substantially equidistantly spaced above and below the fundamental frequency response. Alternatively, the tones are not equidistantly spaced.

In step 602, a first order pole-residue frequency response is generated from the three or more vibrational responses. The first order pole-residue frequency response takes the form given in equation (23).

In step 603, the mass parameter (M) is determined from the first order pole-residue frequency response. The mass parameter (M) is determined by determining the first order pole (λ) and the first order residue (R) of the vibrational responses. Then, the natural frequency $\omega_n$, the damped natural frequency $\omega_d$, and the decay characteristic (0 are determined from the first order pole (λ) and residue (R). Subsequently, the damped natural frequency $\omega_d$, the residue (R), and the imaginary term (j) are plugged into equation (17) in order to obtain the mass parameter (M).

In step 604, the stiffness parameter (K) is determined from the solution of equation (18). The solution employs the natural frequency $\omega_n$ and the determined mass parameter (M) from step 603 are plugged into equation (18) in order to obtain the stiffness parameter (K).

In step 605, the damping parameter (C) is determined from the solution of equation (19). The solution employs the decay characteristic (ζ), the natural frequency $\omega_n$, and the determined mass parameter (M).

In embodiments, methods for automatically adjusting the internal filtering used in the stiffness calculation are provided for meter verification. It should be noted that this gain decay meter verification method relies on at least one of stable pickoff voltages, stable drive current, stable tube frequency, and stable temperature in order to calculate a repeatable stiffness measurement. These variables will be referred to generally as the "gain decay variables." Other factors including (but not limited to) flow noise, external system noise, and meter type will influence the amount of filtering needed on the pickoff voltages and drive current measurements. For example, as flow rate increases, more noise will generally be associated with pickoff voltages and drive current. Therefore, increased filter sampling may be desirable. A balance is ideal, as excess filtering can negatively affect the amount of time needed to perform a measurement, yet insufficient filtering leads to inaccuracies. Furthermore, incorrect filtering can also lead to skewed data and potential false failures.

Figure 7:
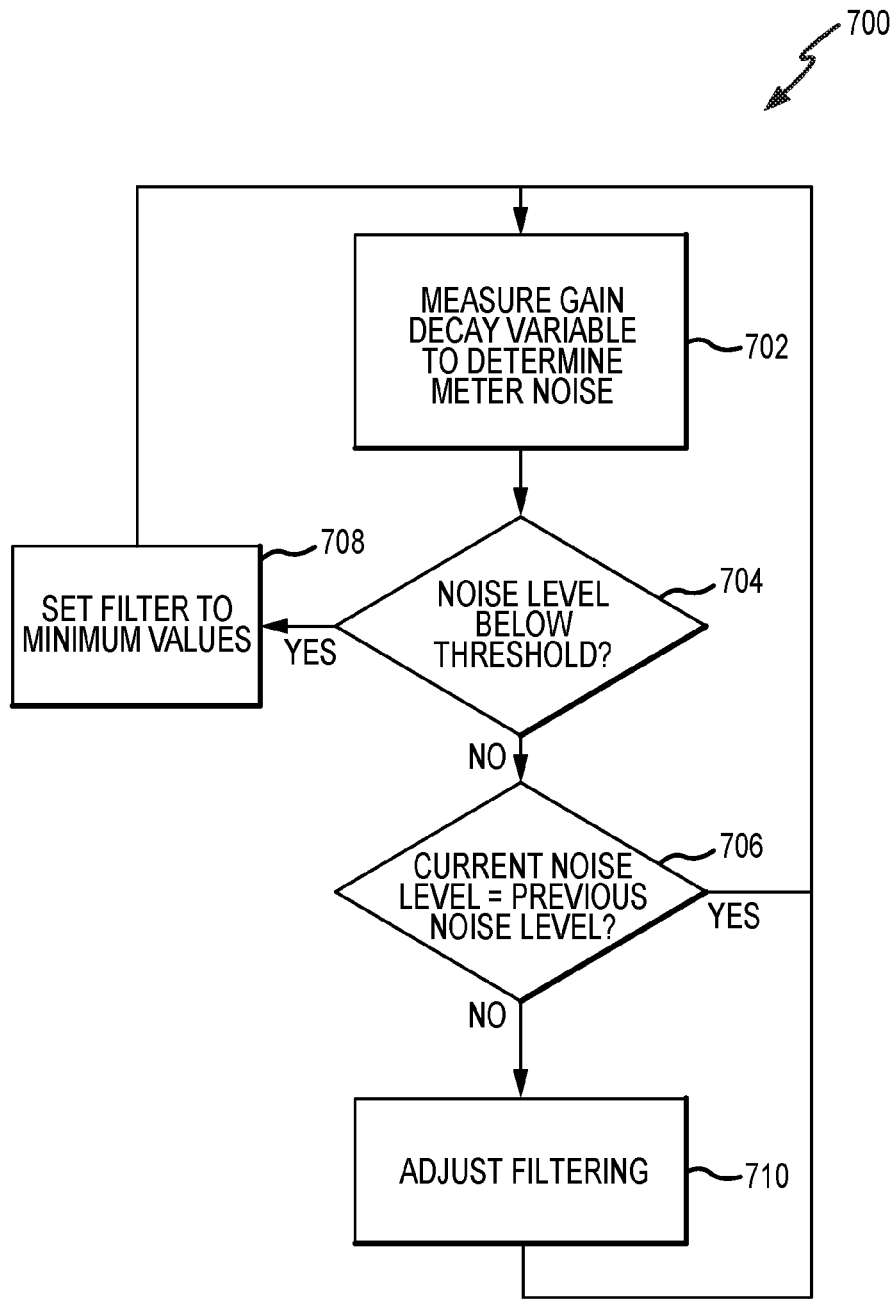
FIG. 7 is flowchart of a method for automatic filter adjustment according to an embodiment.

In an embodiment, an analysis is performed on at least one of a series of gain decay variables. As noted above, the gain decay variables may comprise at least one of pickoff voltages, drive currents, flowtube frequency, and temperature. The analysis comprises determining the stability of at least one of the gain decay variables and adjusting filters accordingly. Turning to FIG. 7, an outline of a method for automatic filter adjustment 700 is provided according to an embodiment.

In step 702, at least one gain decay variable is measured, in order to determine whether the meter is considered to be noisy. For example without limitation, a number of temperature measurements may be taken over a predetermined time period, and the standard deviation or coefficient of variation may be calculated.

In step 704, if the standard deviation or coefficient of variation is below a predetermined threshold value, then the meter is deemed to be not noisy, and related filtering is set to a predetermined minimum value in step 708.

In an alternate embodiment step 704 is performed such that an alternative means of adjusting the filter based on system requirements is accomplished. An adaptive algorithm can be used consisting of a loop that monitors the standard deviation or coefficient of variation of the gain decay variables. However, in this embodiment, if the statistical analysis shows that the variables are not within a target range, the gain decay variable filtering can be adjusted until the variables are within the target range. This substitutes for simply ascertaining whether a gain decay variable is below a predetermined threshold value. This method allows for both increasing and decreasing the filtering based on whether the variables are above or below the target range.

For embodiments where the coefficient of variation (CV) is utilized, it may be calculated as follows:

$$CV = \frac{\text{Standard Deviation}}{\text{mean}} \quad (24)$$

From step 708, a loop is formed with step 702, in a manner where noise levels are repeatedly checked, such that noise status is regularly polled. However, if in step 704, the standard deviation or coefficient of variation is above a predetermined threshold value, then the meter is deemed to be noisy, and it is next determined whether the measured noise level equals a previously measured noise level in step 706.

If the current noise level equals the previously measured noise level, then a loop is formed with step 702. However, in step 706, if the measured current noise level fails to equal the previously measured noise level, gain decay filter variables are adjusted in step 710. Such adjustments may include increasing the number of filtering events, the types of filters employed, and/or the number of samples filtered. For example, simple average or moving average filters can be applied multiple times to improve attenuation. Additionally, the number of samples averaged can be increased to achieve better performance. Of course, the greater the number of samples collected, the longer it takes for a measurement to be completed.

Basically, once an analysis has been done on the gain decay variables to determine stability, a decision can be made to change the type of filter or the filtering time. For example, if the noise level is low, the filter time could be reduced to minimum values to reduce the total test time, as is exemplified by step 708. Conversely, if noise is high, the filter time could be increased or the filter type changed to get a repeatable measurement. The same noise analysis could adjust the number of decay characteristic (zeta) samples to improve the accuracy of that measurement as well. The decay characteristic is considered to be one of the most time consuming variables to calculate. There is a fixed amount of time it takes for a given sensor to naturally decay down by a certain voltage. This time usually increases as the sensor goes up in size. Then there is the time it takes for the sensor to return to stable pickoff voltages so that the other variables can be calculated. Because of this, it is typical to perform one natural decay and only have one corresponding decay characteristic measurement. If there is noise in the system that corrupts the decay processes, the decay measurement will vary, causing the stiffness measurement to vary as well.

In the example shown, only a single gain decay variable is polled to check for meter stability/noise. In some embodiments, more than one gain decay variable is polled. In some embodiments, if it is determined that one of the more than one gain decay variables being polled indicates noise, then filters are adjusted as described herein. In some embodiments, each gain decay variable may be weighted, such that smaller noise tolerances are associated with particular gain decay variables.

Though temperature was exemplified above, in related embodiments, pickoff voltage stability may be determined for ascertaining sensor noise. Pickoff voltage is a key variable in the calculation of stiffness which is used to determine the overall health of a given meter. Stiffness is a measurement of the structural integrity of the flow tube within the sensor. By comparing stiffness measurements with those done at the factory or when the sensor was installed, a flowmeter operator can determine if the structural integrity of the tubes during operation is the same as it was upon initial installation. Methods provided determine when pickoff voltages are stable enough for repeatable and accurate stiffness measurements. Stable pickoff voltages are an extremely useful metric for determining repeatable stiffness measurements when applying the gain decay meter verification embodiments. If pickoff voltages are changing while drive current and frequency are constant, the stiffness calculation will be skewed. Additionally, waiting for a fixed time is inefficient as the time it takes to reach stability is a factor of drive current, sensor size, and noise within the system.

By calculating the CV of the pickoff voltage, the variation of the pickoff voltage may be related to the mean of the pickoff voltage. In practical terms, this means a standard CV limit can be used for a number of sensor types to determine stability. Values that exceed this limit indicate an unstable pickoff voltage that can result in incorrect stiffness data. For a given sensor, the pickoff voltage can change with environmental or process conditions. Across a family of sensors encompassing various different sizes, the pickoff voltage can vary even more due to mechanical and magnetic differences between the sensors. Because of the differences in pickoff voltages, an absolute limit on the standard deviation cannot be used for all sensors. For example, a 50 mV standard deviation for a sensor operating at 100 mV might indicate an unstable pickoff voltage, but the same standard deviation for a sensor operating at 1V could be normal operation. A relative measurement, like the CV, thus provides greater insight into the percentage that the noise contributes to the overall average pickoff voltage.

With regard to different sensor types, there are countless models, sizes, constructions, applications, etc. of sensors, and the pickoff voltages, drive currents, tube frequencies, temperatures, etc. and associated operating ranges and noise level thresholds will be understood by those skilled in the art to vary greatly, depending on the meter itself and process variables and environments.

Figure 8:
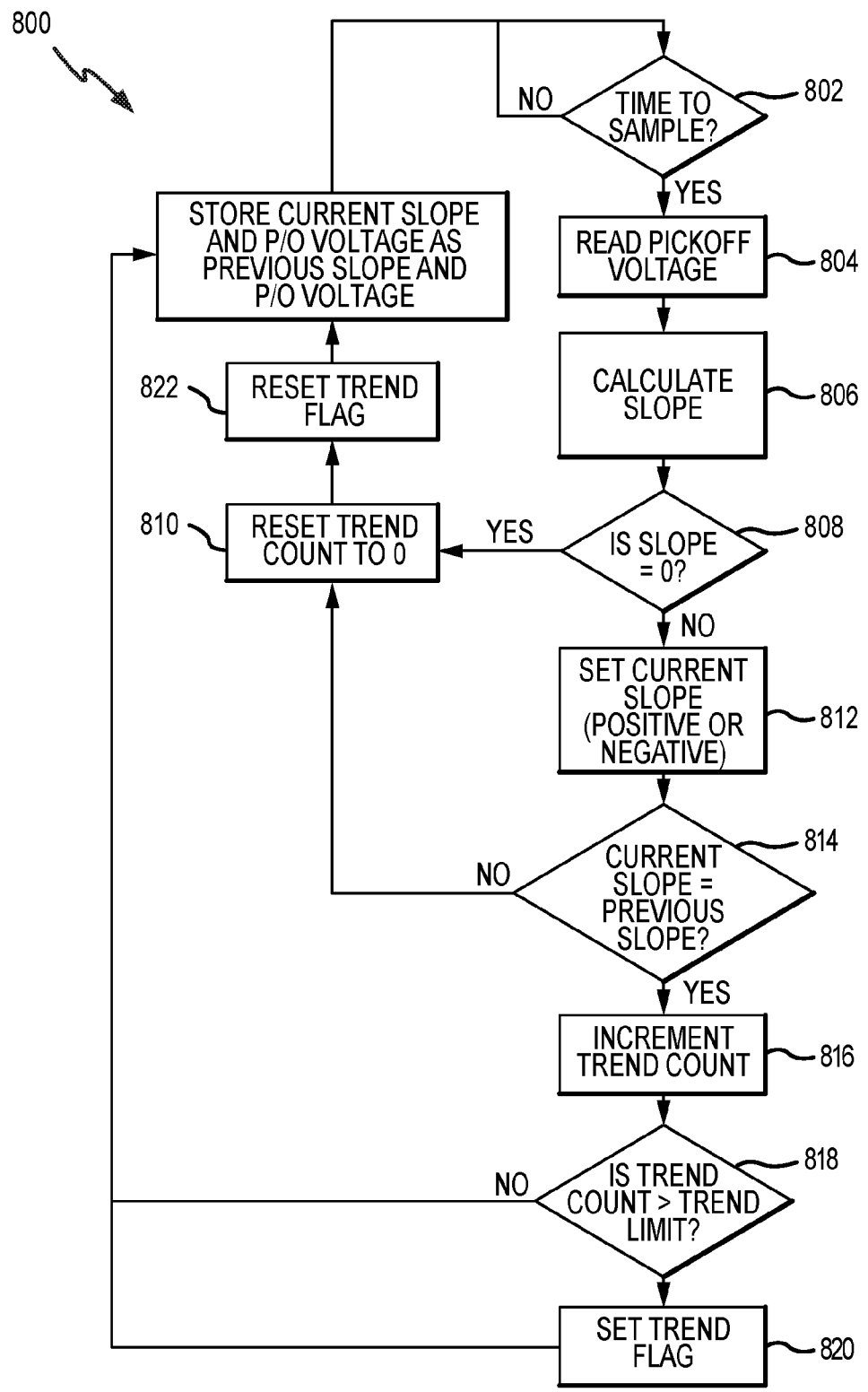
FIG. 8 is flowchart of a method for trend analysis for automatic filter adjustment according to an embodiment.

Turning to FIG. 8, an embodiment of trend analysis 800 is disclosed. Trend analysis is performed on the pickoff voltage, for example, to determine whether meter verification should be run.

In step 802 it is determined whether it is an appropriate moment, given the large number of meter operations, to take a sample. If so, the pickoff voltage is measured in step 804.

Over time, multiple pickoff voltages will be measured and recorded, and in step 806, a pickoff voltage slope is calculated. By looking at the slope of the pickoff voltage from one slope sample to the next, a trend can be determined. The calculation takes a data pair and calculates the slope.

A next iteration calculates a slope from a subsequent data pair, and the slopes are compared in step 808.

If the slopes are different, there is no trend, and a trend count is reset to 0 in step 810 and a trend flag is also reset in step 822.

However in steps 812 and 814 if the sign of the current and compared voltage slopes are the same, this indicates a trend, and trend counter is incremented in step 816.

The trend counter value is compared to a predetermined trend limit in step 818, and if the counter exceeds the final limit, a trend has been deemed to be detected, the trend flag is set in step 820, and meter verification should be aborted.

A trend indicates that data is changing. Because filtering/averaging is relied upon, averaged data does not accurately represent actual data in the presence of a trend, as averaging weights data at all times equally. If the averaged data is incorrect, the final stiffness calculation will be incorrect, potentially resulting in false failures or false passes. Finally, if the difference between two consecutive average pickoff voltage samples exceeds a limit, meter verification should not be run. This checks for large changes in the mean to determine whether meter verification should be run. This same method may be used for other gain decay variables.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

I claim:

1. A method for verifying accurate operation for a flow meter (5), comprising the steps of:
   receiving a vibrational response from the flow meter (5), wherein the vibrational response comprises a response to a vibration of the flow meter (5) at a substantially resonant frequency;
   measuring at least one gain decay variable;
   determining whether the gain decay variable is outside a predetermined range; and
   adjusting a filter used in a stiffness calculation if the gain decay variable is outside the predetermined range;
   maintaining accurate flowmeter operation by adjusting the filter used in the stiffness calculation.

2. The method for verifying accurate operation for a flow meter (5) of claim 1, wherein the step of measuring at least one gain decay variable comprises:
   measuring the at least one gain decay variable at a first time point;
   measuring the at least one gain decay variable at a second and different time point; and
   adjusting the filter only if the at least one measured gain decay variable value at the first time point is different from the at least one measured gain decay variable value at the second time point.

3. The method for verifying accurate operation for a flow meter (5) of claim 1, wherein the gain decay variables comprise at least one of a pickoff voltage, drive currents, flowtube frequency, and temperature.

4. The method for verifying accurate operation for a flow meter (5) of claim 3, comprising:
   measuring a first slope of one of the gain decay variables over a first time period;
   measuring a second slope of the same one of the gain decay variables over a second time period;
   determining a trend exists if the first slope and second slope are the same; and
   preventing meter verification while a trend exists.

5. The method for verifying accurate operation for a flow meter (5) of claim 1, wherein a coefficient of variation (CV) of the at least one gain decay variable is calculated.

6. The method for verifying accurate operation for a flow meter (5) of claim 1, wherein the step of adjusting filtering comprises at least one of increasing the number of filtering events, the types of filters employed, and the number of samples filtered.

7. The method for verifying accurate operation for a flow meter (5) of claim 1, comprising the steps of:
   measuring a decay characteristic ($\zeta$) by removing the excitation of the flow meter (5);
   allowing a vibrational response of the flow meter (5) to decay down to a predetermined vibrational target while measuring the decay characteristic; and
   adjusting filtering by changing a number of decay characteristic samples taken.

8. Meter electronics (20) for verifying accurate operation for a flow meter (5), the meter electronics (20) comprising an interface (201) for receiving a vibrational response from the flow meter (5), with the vibrational response comprising a response to a vibration of the flow meter (5) at a substantially resonant frequency, and a processing system (203) in communication with the interface (201), with the meter electronics (20) comprising:
   the processing system (203) being configured to measure at least one gain decay variable, determine whether the gain decay variable is outside a predetermined range, and adjust filtering used in a stiffness calculation if the gain decay variable is outside the predetermined range, wherein accurate flowmeter operation is maintained by adjusting the filter used in the stiffness calculation.

9. The meter electronics (20) of claim 8, wherein measuring at least one gain decay variable comprises measuring the at least one gain decay variable at a first time point, and measuring the at least one gain decay variable at a second and different time point, and adjusting filters only if the at least one measured gain decay variable value at the first time point is different from the at least one measured gain decay variable value at the second time point.

10. The meter electronics (20) of claim 8, wherein gain decay variables comprise at least one of pickoff voltages, drive currents, flowtube frequency, and temperature.

11. The meter electronics (20) of claim 10, wherein the processing system (203) is further configured to measure a first slope of one of the gain decay variables over a first time period and a second slope of the same one of the gain decay variables over a second time period, and determine that a trend exists if the first slope and second slope are the same, wherein meter verification is prevented while a trend exists.

12. The meter electronics (20) of claim 8, wherein a coefficient of variation (CV) of the at least one gain decay variable is calculated.

13. The meter electronics (20) of claim 8, wherein adjusting filtering comprises at least one of increasing the number of filtering events, the types of filters employed, and the number of samples filtered.

14. The meter electronics (20) of claim 8, with the processing system (203) being further configured to measure the decay characteristic ($\zeta$) by removing the excitation of the flow meter (5) and allowing the vibrational response of the flow meter (5) to decay down to a predetermined vibrational target while measuring the decay characteristic, and wherein adjusting filtering comprises changing a number of decay characteristic samples taken.

\* \* \* \* \*

UNITED STATES PATENT AND TRADEMARK OFFICE
CERTIFICATE OF CORRECTION

PATENT NO. : 11,821,779 B2  
APPLICATION NO. : 17/260311  
DATED : November 21, 2023  
INVENTOR(S) : Bert J. Downing Page 1 of 1

It is certified that error appears in the above-identified patent and that said Letters Patent is hereby corrected as shown below:

In the Specification

Column 11, Line 31, the equation should appear as follows:
$$M\ddot{x} + C\dot{x} + Kx = f(t) \qquad (10)$$

Column 14, Line 22, replace "decay characteristic (0 are" with -- decay characteristic ($\zeta$) are --

Signed and Sealed this  
Twenty-eighth Day of January, 2025

Coke Morgan Stewart  
*Acting Director of the United States Patent and Trademark Office*